(12) United States Patent
Wu et al.

(10) Patent No.: US 12,417,287 B2
(45) Date of Patent: Sep. 16, 2025

(54) RISC-V AND O-CFI MECHANISM-BASED DEFENSE METHOD AND APPARATUS FOR CODE REUSE ATTACKS

(71) Applicant: INSTITUTE OF SOFTWARE, CHINESE ACADEMY OF SCIENCES, Beijing (CN)

(72) Inventors: Yanjun Wu, Beijing (CN); Chang Liu, Beijing (CN); Chen Zhao, Beijing (CN); Jingzheng Wu, Beijing (CN); Zhiqing Rui, Beijing (CN); Bin Wu, Beijing (CN); Tianyue Luo, Beijing (CN)

(73) Assignee: INSTITUTE OF SOFTWARE, CHINESE ACADEMY OF SCIENCES, Beijing (CN)

( * ) Notice: Subject to any disclaimer, the term of this patent is extended or adjusted under 35 U.S.C. 154(b) by 15 days.

(21) Appl. No.: 18/275,330

(22) PCT Filed: Dec. 3, 2021

(86) PCT No.: PCT/CN2021/135256
§ 371 (c)(1),
(2) Date: Aug. 1, 2023

(87) PCT Pub. No.: WO2023/019807
PCT Pub. Date: Feb. 23, 2023

(65) Prior Publication Data
US 2024/0095360 A1    Mar. 21, 2024

(30) Foreign Application Priority Data
Aug. 17, 2021 (CN) .......................... 202110942052.0

(51) Int. Cl.
*G06F 21/00* (2013.01)
*G06F 8/75* (2018.01)
*G06F 21/56* (2013.01)

(52) U.S. Cl.
CPC .............. *G06F 21/566* (2013.01); *G06F 8/75* (2013.01); *G06F 2221/033* (2013.01)

(58) Field of Classification Search
CPC .......... G06F 21/14; G06F 8/75; G06F 21/566; G06F 2221/033
See application file for complete search history.

(56) References Cited

U.S. PATENT DOCUMENTS

2008/0040593 A1    2/2008   Kaabouch et al.
2015/0135313 A1*   5/2015   Wesie ..................... G06F 21/51
                                                     726/22

(Continued)

FOREIGN PATENT DOCUMENTS

CN       105653905 A     6/2016
CN       108090346 A     5/2018

(Continued)

OTHER PUBLICATIONS

Office Action issued Dec. 29, 2021 in priority application with Search Report, and CN pat. No. 113672922 B issued on priority application.

*Primary Examiner* — Tri M Tran
(74) *Attorney, Agent, or Firm* — Dilworth & Barrese, LLP.; Michael J. Musella, Esq.

(57) ABSTRACT

Disclosed are a RISC-V and O-CFI mechanism-based defense method and apparatus for code reuse attacks, comprising: constructing a control flow graph according to program source codes randomized in a basic block order; on the basis of the control flow graph, obtaining a boundary range of a control flow transfer branch; executing the program source codes, obtaining a target node to which each (Continued)

control flow is to be transferred, and analyzing each target node in combination with the boundary range so as to defend against an abnormal control flow. The present invention can identify an illegal control flow transfer with the assistance of RISC-V security hardware according to the characteristics of a program control flow itself, and effectively handle code reuse attacks, thereby enhancing the security defense capabilities of an RISC-V system.

7 Claims, 5 Drawing Sheets

(56) References Cited

U.S. PATENT DOCUMENTS

| | | | |
|---|---|---|---|
| 2015/0378868 A1* | 12/2015 | Levit-Gurevich | ............................ G06F 11/3692 714/38.1 |
| 2017/0213039 A1 | 7/2017 | Werner et al. | |
| 2019/0156025 A1 | 5/2019 | Wallace et al. | |
| 2021/0133314 A1 | 5/2021 | Wang et al. | |

FOREIGN PATENT DOCUMENTS

| | | |
|---|---|---|
| CN | 109558726 A | 4/2019 |
| CN | 111538962 A | 8/2020 |
| CN | 112966258 A | 6/2021 |
| CN | 113672922 A | 11/2021 |
| WO | 2018/113642 A1 | 6/2018 |

\* cited by examiner

| INST | DESCRIPTION | ENCODING DETAILS |
|---|---|---|
| OCheck | instruction to verify boundary of branches | Opcode: encoding of instruction operate code in custom encoding space.<br>Func: the transfer type of current control flow.<br>　　with value 001 = jump, 011 = call, 111 = return.<br>BranchID: the transfer branch of current control flow.<br>Target: target node to which the current control flow will transfer.<br>Res: register to store the result of instruction execution.<br>　　with value 0 = execution succeeded, 1 = execution failed.<br>　if execution failed, throw an exception and terminate. |
| BITS | LEN | MEANING |
| 31:25 | 7 | reserved. |
| 24:20 | 5 | Target : transfer target of current branch. |
| 19:15 | 5 | BranchID : current branch. |
| 14:12 | 3 | Func : the transfer type of control flow. |
| 11:7 | 5 | Res : result of instruction execution. |
| 6:0 | 7 | Opcode : instruction operation code. |

Figure 5

RISC-V AND O-CFI MECHANISM-BASED DEFENSE METHOD AND APPARATUS FOR CODE REUSE ATTACKS

TECHNICAL FIELD

This invention relates to the field of computer technology, in particular to a RISC-V and O-CFI mechanism-based defense method and apparatus for code reuse attacks.

BACKGROUND ARTS

The computer system is playing an increasingly important role in modern society. It supports and promotes the process of digitalization and informatization in all walks of life, making the economy, culture, education, medical treatment and other fields surpass the traditional manual form and achieve leapfrog development. However, attacks on computer systems also emerge in endlessly, threatening the security and stability of computer systems at all times. How to protect the computer system from malicious attacks and ensure the correctness of the computer program operation and the credibility of the execution results is a major problem that needs to be solved by academia and industry. Code reuse attack is a kind of attack means against system memory and program execution that has emerged in recent years. Attackers can take advantage of memory-related vulnerabilities to change the execution order of existing program codes in memory to achieve their attack purpose. Specifically, code reuse attacks can be further divided into return to libc attacks (Return-to-Libc), ROP attacks (Return Oriented Programming), and JOP attacks (Jump Oriented Programming) according to the different codes used. Start from these, attackers can execute arbitrary code in memory, disrupt the normal execution process of programs, and pose a considerable threat to the security of computer systems.

In order to prevent code reuse attacks from damaging the program execution process, researchers have proposed many defense methods. Control Flow Integrity (CFI) is one of the basic methods to deal with such attacks. By restricting the transfer process of the program control flow towards the unauthorized location, it ensures that the control flow can only be transferred within the trusted range. In practice, CFI is usually supplemented and improved according to different security requirements and application scenarios, thus forming a variety of different and more specific CFI mechanisms. O-CFI (Opaque CFI) is a new CFI mechanism proposed by Vishwath Mohan et al. in 2015. By introducing a control flow check method, it can hide the process of program control flow transfer from attackers and increase the difficulty of control flow hijacking. However, the work of Vishwath Mohan et al. only designed a prototype system for this mechanism in the x86 environment, using the memory-protection extensions (MPX) which is unique to Intel x86/x64 and is difficult to directly migrate and extend to other system architectures; Since the prototype system, there is also no more practical achievement based on the O-CFI mechanism.

In order to solve the landing problem that the O-CFI mechanism is difficult to implement in a more general computer system working environment, the present invention proposes an implementation solution based on RISC-V extended instruction set. The present invention can identify illegal control flow transfer based on the characteristics of program control flow itself and with the assistance of RISC-V security hardware, effectively deal with code reuse attacks, and thus enhance the security defense capability of RISC-V system.

SUMMARY OF THE INVENTION

The present invention aims to provide a RISC-V and O-CFI mechanism-based defense method and apparatus for code reuse attacks. The said defense method, in form of RISC-V extended instruction set, realizes the analysis and management of control flow by O-CFI mechanism and makes control flow transfer process fuzzy. The said method can effectively enhance the system's defense ability against code reuse attacks and improve the security of RISC-V system.

To achieve the above purpose, the present invention adopts the following technical solution:

A RISC-V and O-CFI mechanism-based defense method for code reuse attacks includes the following steps:
1) constructing a control flow graph according to program source codes randomized in a basic block order;
2) obtaining the boundary range of a control flow transfer branch on the basis of the control flow graph;
3) executing the program source codes, obtaining each the target node to which the control flow is to be transferred, and analyzing each target node in combination with the boundary range so as to defend against an abnormal control flow.

Further, the methods to randomize the basic block order of the program source codes include: the directional modification to the compiler, or the implementation in the customized RISC-V security hardware based on ASLR technology.

Further, the control flow graph is constructed through the following steps:
1) generating an abstract syntax tree for the program source code, wherein each node of the abstract syntax tree represents a statement or a statement block, and each node is given an attribute "trans", the attribute value of the trans attribute corresponds to whether the node is a node that can cause control flow transfer or a general node;
2) forming the node set "V" according to all nodes in the abstract syntax tree;
3) obtaining the directed edge set "E" by taking the control flow paths between any two nodes;
4) finding the entry node of the program "nentry" and the exit node of the program "nexit" in the abstract syntax tree;
5) constructing control flow graph G=(V, E, nentry, nexit).

Further, the boundary range of the control flow transfer branch is obtained through the following steps:
1) taking one of the nodes $V_i$ that has not been taken yet in node set $V_i$;
2) going to step 3) if the attribute value of the node $V_i$ corresponds to the node that can cause control flow transfer; going to step 1) if the attribute value of the node $V_i$ corresponds to a general node;
3) inserting a RISC-V extension instruction to verify the control flow transfer branch boundary before node $V_i$;
4) on the basis of the control flow graph and the described RISC-V extension instruction, finding the transfer target nodes which start from node $V_i$ and have a direct control flow path, and obtaining the target address set $T_i$ to be transferred;

5) comparing the memory addresses of each node in the target address set $T_i$ to be transferred, and obtaining the node $V_{low}$ with the lowest address and the node $V_{high}$ with the highest address;
6) obtaining the boundary range of control flow transfer branch corresponding to node $V_i$ according to the node $V_{low}$ and $V_{high}$;
7) repeating steps 1)-6) until all nodes $V_i$ are taken, so as to obtain the boundary range of the control flow transfer branch.

Further, for the described RISC-V extension instruction verifying the branch boundary of control flow transfer, the customized instruction format of it includes:
1) Opcode field, indicating the encoding of instruction operation code in the custom encoding space;
2) Func field, indicating the type of current control flow transfer;
3) BranchID field, indicating the transfer branch of the current control flow;
4) Target field, indicating the target node to which the current control flow will be transferred;
5) Res field, indicating the register that stores the result of instruction execution.

Further, the types of the current control flow transfer include: call, jump or return.

Further, the abnormal control flow is defended against through the following steps:
1) calculating the boundary range Boundary $[V_{trans}]$ corresponding to control flow transfer node $V_{trans}$,
2) throwing an exception and terminate the program if the boundary range Boundary $[V_{trans}]$ does not exist; otherwise, going to step 3);
3) obtaining the memory address $A_{min}$ corresponding to the lowest address node $V_{low}$ and the memory address $A_{max}$ corresponding to the highest address node $V_{high}$ according to the boundary range Boundary $[V_{trans}]$;
4) obtaining the target node $V_t$ to which the current control flow will be transferred, and the corresponding memory address $A_t$;
5) throwing an exception and terminate the program if the current control flow is not normal, wherein the current control flow is normal if $A_{min} \leq A_t \leq A_{max}$.

A storage medium, in the storage medium a computer program is stored, wherein the computer program is set to execute the above method at runtime.

An electronic apparatus, including a memory and a processor, wherein the memory stores a program for executing the method described above.

The technical effects of this invention include:
1. Through the analysis of control flow, determine the legal target address range of control flow transfer, so then realizing the identification and restriction of illegal control flow transfer, and at the same time, hide the process of control flow transfer from attackers, effectively respond to code reuse attacks, and enhance the system's security defense capability.
2. Proposed a method of implementing O-CFI mechanism by using RISC-V extended instruction set. According to the characteristics of program control flow itself and with the assistance of RISC-V security hardware, realize the O-CFI mechanism's analyses and management of the control flow, and expands the application scope of system architecture for O-CFI mechanism.
3. The implementation method of O-CFI mechanism based on RISC-V extended instruction set reflects the role of hardware in system security defense. By incorporating hardware into the defense system and realizing the software and hardware coordination of defense, the system security can be more effectively guaranteed.

BRIEF DESCRIPTION OF THE DRAWINGS

FIG. 5 is a schematic diagram of the instruction format design of the RISC-V extension instruction used to verify the control flow transfer branch boundary.

DETAILED DESCRIPTION OF THE IMPLEMENTATIONS

In order to make the purpose, technical solutions and advantages of the present invention more clear, the present invention is further described in details below with the drawings.

Figure 1:
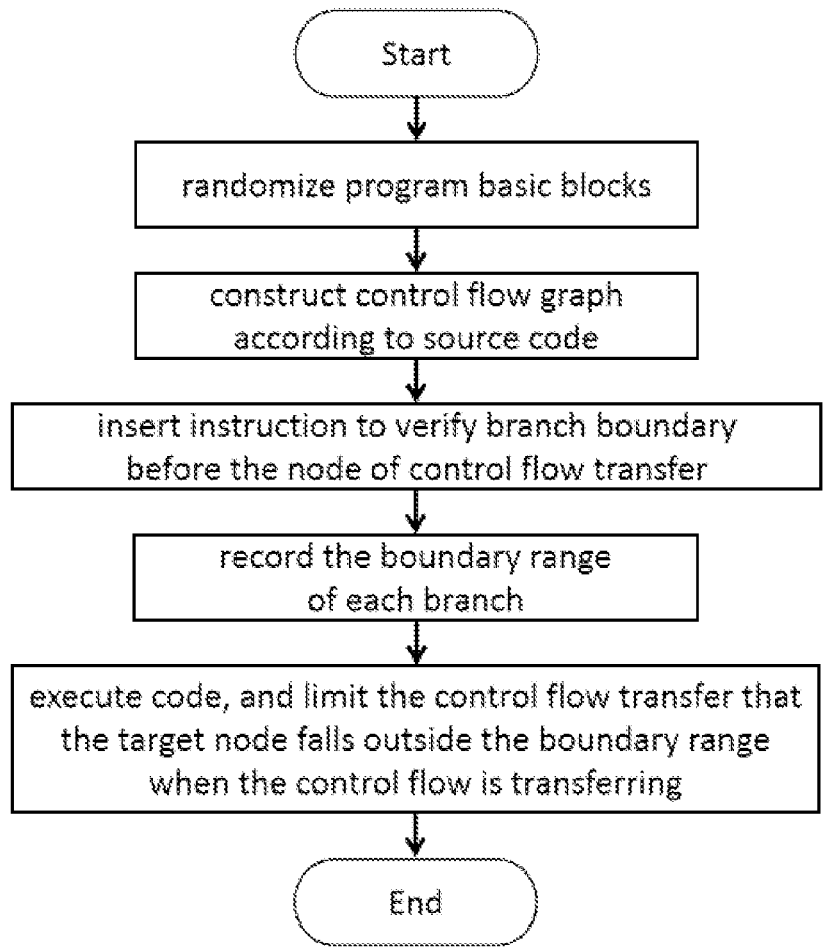
FIG. 1 is the flowchart of code reuse attack defense method based on O-CFI mechanism in RISC-V system.

This implementation is based on the code reuse attack defense method of RISC-V and O-CFI mechanism. The overall flow is shown in FIG. 1, which mainly includes the following steps:
1) Randomizing the sequences of program basic blocks. The basic block of a program is a sequence of statements executed in order in the program code. Each basic block has only one entry and one exit. The randomization of the basic block sequence helps to resist the attacker's understanding of the system and program implementation, and increases the difficulty for the attacker to locate its attack target;

This step can be realized based on RISC-V security hardware using existing technologies (such as ASLR, etc.); Or the compiler should be modified to make the program source code complete the basic block randomization process during the compilation and optimization process.

Figure 2:
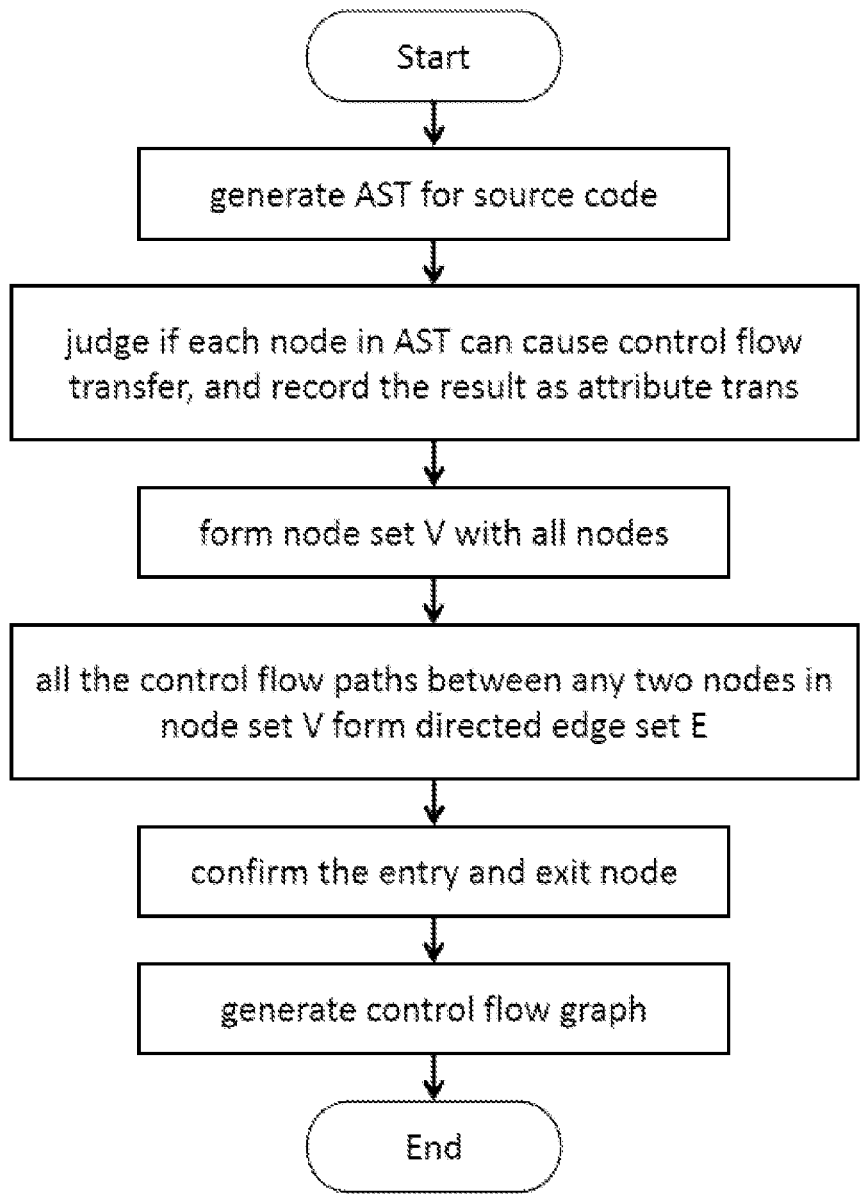
FIG. 2 is a flowchart for constructing a program's control flow graph.

2) Constructing the control flow graph according to the program source code. Control Flow Graph (CFG) is a directed graph that describes the execution order of program code. Suppose the structure of the control flow graph G=(V, E, entry, exit). Where, "V" is the collection of nodes, and each node corresponds to a statement or a statement block in the program; "E" is the collection of directed edges. Each directed edge corresponds to a possible control flow path between two nodes; "nentry" and "nexit" correspond to the entry and exit nodes of the program respectively. The process is shown in FIG. 2, and the details are as follows:
 2a) Generating abstract syntax tree AST for program source code. Each node of the abstract syntax tree AST represents a statement or a statement block. Each node is given an attribute "trans", whose attribute value corresponds to the judgment of whether the node is a node that can cause control flow transfer. The value range is {true, false}, and represents the node that can cause control flow transfer and the general node respectively. Go to 2b).
 2b) Forming node set "V" according to all nodes in AST, and go to 2c).
 2c) Determining whether there are control flow paths between any two nodes according to AST, and record all existing control flow paths as directed edge set "E". Go to 2d).

2d) Finding the entry node "nentry" and exit node "nexit" of the program according to AST. Go to 2e).

2e) Combining the node set "V", the directed edge set "E", the entry node "nentry" and the exit node "nexit" found in the above steps to form the control flow graph "G", so that G=(V, E, nentry, nexit).

Figure 3:
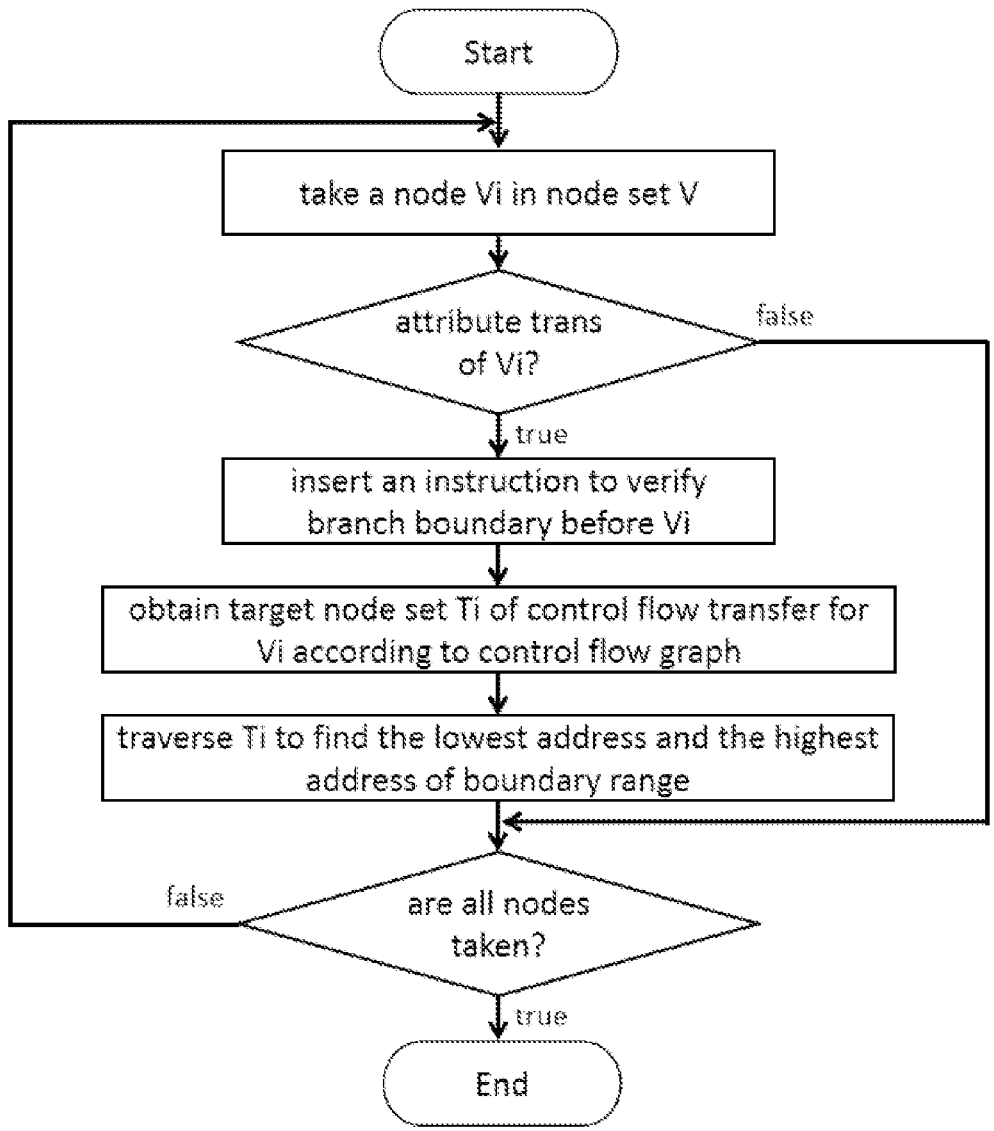
FIG. 3 is a flowchart for constructing the branch boundary range of the control flow transfer node.

3) Analyzing the flow of control flow transfer branches. The process is shown in FIG. 3; The instruction format of the RISC-V extension instruction used to verify the branch boundary is shown in FIG. 5. The details are as follows:

3a) According to the control flow graph "G", in its node set "V", taking one of the nodes $V_i$ that has not been taken. Going to 3b).

3b) Determining the value of attribute "trans" of node $V_i$. If it is true, $V_i$ is the node that can cause control flow transfer, go to 3c); If it is false, $V_i$ is a general node, go to 3g).

3c) Inserting a branch boundary verification instruction before node $V_i$. Go to 3d).

3d) Starting from node $V_i$ finding out all transfer target nodes with direct control flow path according to control flow graph "G", and recording them as target node set $T_i$. Go to 3d).

3e) Traversing the node set $T_i$, comparing the memory addresses corresponding to each node, and finding out the node $V_{low}$ at the lowest address and the node $V_{high}$ at the highest address. Go to 3e).

3f) Recording the memory address corresponding to nodes $V_{low}$ and $V_{high}$ as the boundary range of the control flow transfer node $V_i$, that is, Boundary[$V_i$]= (Addr($V_{low}$), Addr($V_{high}$)).

3g) If there are nodes in node set "V" that have not been taken, going to 3a) to continue processing the remaining nodes.

Among them, the RISC-V extension instruction that verifies the branch boundary of control flow transfer, the customized instruction format includes:

Opcode field, indicating the encoding of instruction operation code in the custom encoding space;

Func field, indicating the transfer type of current control flow, including tree types: call type (call), jump type (jmp) and return type (ret);

BranchID field, indicating the transfer branch of the current control flow;

Target field, indicating the target node to which the current control flow will be transferred;

Res field, indicating the register that stores the result of instruction execution.

Figure 4:
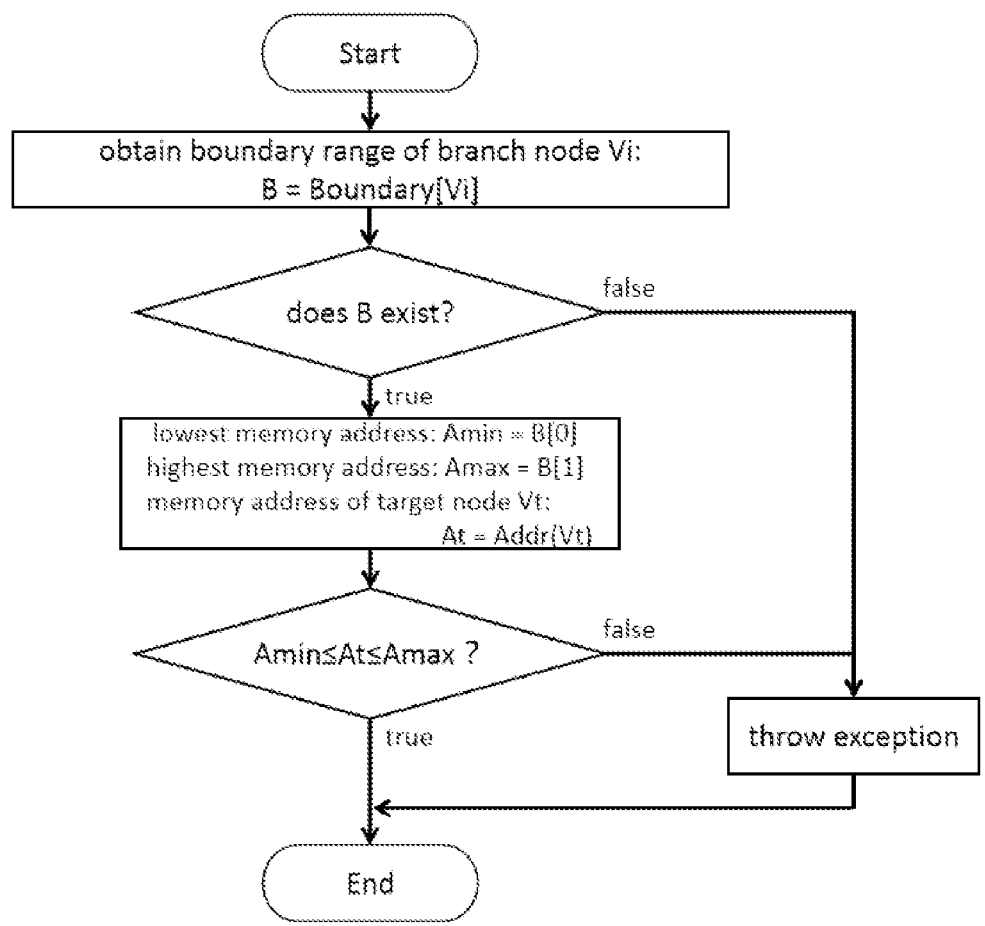
FIG. 4 is a flowchart for verifying the branch boundary range.

4) Executing the code, and verifying the branch boundary when the control flow is transferred. The process is shown in FIG. 4, and the details are as follows:

4a) Obtaining the boundary range Boundary [$V_{trans}$] of the current control flow transfer node $V_{trans}$ Go to 4b).

4b) If Boundary [$V_{trans}$] does not exist, throwing an exception and terminate the program; If it exists, going to 4c).

4c) Obtaining the lowest memory address $A_{min}$ and the highest memory address $A_{max}$ that can be transferred to according to the boundary range, that is, $A_{min}$=Boundary[$V_{trans}$][0], $A_{max}$=Boundary[$V_{trans}$][1]. Going to 4d).

4d) Taking the target node $V_t$ to which the current control flow will be transferred, obtaining its corresponding memory address $A_t$, that is, $A_t$=Addr($V_t$). Go to 4e).

4e) Determining whether A t falls within the boundary range of $V_{trans}$, that is, whether $A_{min} \leq A_t \leq A_{max}$ is valid.

If yes, going to 4f); If not, the control flow is considered to have been tampered with, throwing an exception and terminating the program.

4f) Transferring the control flow normally to the target node $V_t$.

The above embodiments are only used to illustrate the technical solution of the invention rather than limit it. Ordinary technicians in the art can modify or equivalent replace this technical solution of the invention without departing from the spirit and scope of this invention. The scope of protection of this invention shall be subject to the Right-Claiming Document.

The invention claimed is:

1. A RISC-V and O-CFI mechanism-based defense method for code reuse attacks, including:

1) constructing a control flow graph according to program source codes randomized in a basic block order through the following steps:

1a) generating an abstract syntax tree for the program source codes, wherein each node in the abstract syntax tree represents a statement or a statement block, and each node is given an attribute "trans", the attribute value of attribute "trans" corresponds to whether the present node is a control flow transfer node Vtrans that can cause control flow transfer, or a general node;

1b) forming node set "V" according to all nodes in the abstract syntax tree;

1c) obtaining directed edge set "E" by using the control flow path between any two nodes;

1d) finding entry node "nentry" of the program and exit node "nexit" of the program in the abstract syntax tree;

1e) constructing control flow graph G=(V, E, nentry, nexit);

2) on the basis of the control flow graph, obtaining each boundary range Boundary of each control flow transfer branch through the following steps:

2a) taking one of the nodes Vi that has not been taken yet from node set "V":

2b) going to step 2c) if the attribute value of attribute "trans" of node Vi corresponds to a control flow transfer node Vtrans; going to step 2a) if the attribute value of attribute "trans" of node Vi corresponds to a general node;

2c) inserting a RISC-V extension instruction to verify the boundary range of its control flow transfer branch before the node Vi:

2d) on the basis of the control flow graph and the RISC-V extension instruction, finding a transfer target node starting from node Vi with a direct control flow path, and obtaining target address set Ti to be transferred;

2e) comparing the memory addresses of each node in the target address set Ti to be transferred, and obtaining node Vlow with the lowest address and node Vhigh with the highest address;

2f) obtaining the boundary range of control flow transfer branch corresponding to node Vi according to node Vlow and node Vhigh;

2g) repeating steps 2a)-2f) until all nodes Vi are taken, so as to get each boundary range Boundary of each control flow transfer branch corresponding to each control flow transfer node Vtrans;

3) executing the program source codes, obtaining a target node to which each control flow is to be transferred, and analyzing each target node in combination with the boundary range so as to defend against an abnormal control flow.

2. The method according to claim 1, wherein the method to randomize the basic block order of the program source codes include: the directional modification to the compiler, or the implementation in the customized RISC-V security hardware based on ASLR technology.

3. The method according to claim 1, wherein the RISC-V extension instruction for verifying the branch boundary of the control flow transfer, the customized instruction format includes:
1) Opcode field, indicating the encoding of instruction operation code in the custom encoding space;
2) Func field, indicating the transfer type of current control flow;
3) BranchID field, indicating the transfer branch of the current control flow;
4) Target field, indicating the target node to which the current control flow will be transferred;
5) Res field, indicating the register that stores the result of instruction execution.

4. The method according to claim 3, wherein the types of the current control flow transfer include: call, jump or return.

5. The method according to claim 1, wherein the abnormal control flow is prevented by the following steps:
1) calculating the corresponding boundary range Boundary of control flow transfer node Vtrans;
2) throwing an exception and terminate the program if the boundary range Boundary does not exist; otherwise, going to step 3);
3) obtaining the corresponding memory address Amin of the lowest address node Vlow and the corresponding memory address Amax of the highest address node Vhigh according to the boundary range Boundary;
4) obtaining target node Vt to which the current control flow will be transferred, and obtaining the corresponding memory address At;
5) throwing an exception and terminate the program if the current flow is abnormal, wherein the current control flow is normal if $Amin \leq At \leq Amax$.

6. A non-transitory signal storage medium, in which a computer program is stored, wherein the described computer program is set to execute the method of claim 1 at runtime.

7. An electronic apparatus, including a memory and a processor, wherein the memory stores a computer program in a non-transitory signal storage medium, and the processor is set to run the described computer program to execute the method of claim 1.

* * * * *